United States Patent

Zheng et al.

[11] Patent Number: 5,232,412
[45] Date of Patent: Aug. 3, 1993

[54] HIGH EFFICIENCY GEAR TRANSMISSION

[76] Inventors: Yue Zheng; Lan Li, both of Room 105 Building 15 (old, Beicun Nankai University, Tianjin, China

[21] Appl. No.: 876,073

[22] Filed: Apr. 28, 1992

Related U.S. Application Data

[63] Continuation-in-part of Ser. No. 550,948, Jul. 11, 1990, abandoned.

[30] Foreign Application Priority Data

Jul. 11, 1989 [CN] China .................. 89104790.5

[51] Int. Cl.[5] .............................................. F16H 1/32
[52] U.S. Cl. .................................. 475/162; 475/176; 74/462
[58] Field of Search ............... 475/176, 177, 180, 162; 74/462

[56] References Cited

U.S. PATENT DOCUMENTS

| | | | |
|---|---|---|---|
| 2,049,696 | 8/1936 | Fliesberg | 475/177 |
| 3,427,901 | 2/1969 | Wildhaber | 475/176 |
| 3,451,290 | 6/1969 | Wildhaber | 475/176 |
| 4,446,752 | 5/1984 | Shaffer et al. | 74/462 |

FOREIGN PATENT DOCUMENTS

| | | | |
|---|---|---|---|
| 0300108 | 1/1989 | European Pat. Off. | |
| 2592121 | 6/1987 | France | |
| 1198737 | 7/1970 | United Kingdom | 475/180 |

Primary Examiner—Allan D. Herrmann
Assistant Examiner—William O. Trousdell
Attorney, Agent, or Firm—Mason, Fenwick & Lawrence

[57] ABSTRACT

A gear pair having a low tooth number differential and a total contact ratio of $\xi_v = \xi_\alpha + \xi_\beta \geq 1$ provided that the profile contact ratio $\xi_\alpha < 1$ and the face contact ratio $\xi_\beta > 0$, wherein the absolute value of the difference of addendum modification coefficients $|X|$ is less than one or equal to zero, thus increasing the transmission efficiency. Additionally, a transmission assembly is provided including such a gear pair construction.

13 Claims, 2 Drawing Sheets

HIGH EFFICIENCY GEAR TRANSMISSION

This application is a continuation-in-part application of U.S. Ser. No. 07/550,948, filed Jul. 11, 1990, now abandoned.

FIELD OF THE INVENTION

The present invention relates in general to a gear pair having a low tooth number differential, and, in particular, to a double internal planetary gear pair having a low tooth number differential as well as a transmission containing such a gear pair.

BACKGROUND OF THE INVENTION

The planetary gear transmission has substantially replaced the fixed-axis gear train transmission in the field of high-efficiency transmissions. However, the primary restriction on further increase in the efficiency of planetary gear transmissions is the limited engagement efficiency of their fixed-axis gear pair and the significant power loss in their planetary bearings. Therefore, a significant advantage exists for an efficient planetary gear transmission having a low tooth number differential that also exhibits a high transmission ratio.

U.S. Pat. No. 3,451,290 to Wildhaber (Wildhaber '290) discloses a high-efficiency gear transmission drive comprising cases or housings, an input shaft and an output shaft. Bearings support a double-ring gear assembly comprised of two coaxial gear rings integrated with each other on an eccentric shaft. A gear ring is coaxially located concentrically and radially outside the double-ring gear assembly and has a different number of gear teeth than the outermost gear of the double-ring assembly. The gear transmission drive further comprises two fixed-axis gears. This construction reduces the load on the high-speed bearings. However, Wildhaber '290 does not discuss the mechanical parameters of these gears, the cooperative effects of which impact fundamentally on the operation of the gear transmission drive.

GB 1,198,737 to Morozumi (Morozumi '737) discloses an addendum modified involute internal gearing assembly including coaxially arranged external and internal gears. In order to improve the efficiency of the gearing, Morozumi '737 suggests that the difference of the addendum modification coefficients $X_2$ and $X_1$, respectively, of the internal gear and the external gear shall satisfy the following formula, hereinafter known as Formula (1):

$$[0.0002 (a_c)^2 - 0.025 a_c + 1.52]h_k + 0.8X_1 > X_2 > Kh_k + X_1$$

wherein $a_c$ is standard pressure angle, $h_k$ is the addendum coefficient and K is 1 when the difference in tooth numbers between the gears is 1 and a function of $a_c$ when the tooth number differential is 2.

In the prior art, including Morozumi '737, $\xi_a \geq 1$ is required for resolving the contradiction of the contact ratio and the interference of an involute internal gear pair having a low tooth number differential. This is because rather than face contact ratio $\xi_\beta$ $$\left( \xi_\beta = \frac{B \cdot \sin \beta}{\pi \cdot m} \right)$$

wherein B is the width of tooth, $\beta$ is the reference helix angle, $\pi = 3.1416$, and m is the normal module, (m is a standard module when the gear is helical) only the profile contact ratio $\xi_a$ (or $\xi$ as shown in Morozumi '737) is taken into account. That is to say, $\xi_a$ has a close relationship with addendum coefficient ha (or "$h_k$" as shown in Morozumi '737, ha equals the ratio between the addendum and the module), but $\xi_\beta$ has nothing to do with the addendum coefficient. In the situation (as in Morozumi '737) wherein only equation $\xi_a \geq 1$ is considered, ha cannot be greatly reduced, hence a larger difference of addendum modification coefficients X ($X = X_2 - X_1$, where $X_1$ is the addendum modification coefficient of the external gear and $X_2$ is the addendum modification coefficient of the internal gear when the gear pair is an internal one, or $X_1$ and $X_2$ are the addendum modification coefficients of the two gears respectively when the gear pair is an external one) is used to offset the larger ha. As a result, the angle of engagement is larger, thus exacerbating engagement inefficiency and bearing loss. For example, Morozumi '737 defines that $\xi_a > 1$, even $\xi_a > 2$. Under such premise, for the formula put forward in Morozumi '737 (see Formula (1) described above), in order to satisfy the interference condition for correct engagement of an involute internal gear pair having reduced tooth number differential, by adjusting the parameters $X_1$, $X_2$, $h_k$ and $a_c$, a large X should be used, thus reducing the drive efficiency.

The present invention has gone beyond the known definition $\xi_a \geq 1$ for an involute internal gearing pair having a low tooth number differential, e.g., 6 or less, and provides that $\xi_a < 1$ may be used on condition that $\xi_a > 0$ and $\xi_v = \xi_a + \xi_\beta \geq 1$ or even $\xi_v = \xi_a + \xi_\beta \geq 0.7$. Since face contact ratio $\xi_\beta$ is meaningful in relationship only to reference helix angle $\beta$, tooth width B and module m, and since it has nothing to do with ha, an increase of $\xi_\beta$ does not affect a reduction of ha. As a result, ha may be greatly reduced until ha = 0.06 to 0.2 (when tooth number difference Zd = 1). Therefore, the problem of interference is resolved without increasing the difference in addendum modification coefficients X, and a relation $|X| < 0.1$ or even $X = 0$ may be allowed. Therefore, engagement and transmission efficiency are increased and bearing loss is reduced.

Morozumi '737, on the other hand, defines that $\xi_a > 1$. For meeting the requirement that no interference occur, according to Formula (1) described above, the addendum coefficient hk is difficult to reduce to less than 0.6 (when Zd is equal to 1 or 2), and the difference in addendum modification coefficients X is difficult to reduce to less than 0.5. By contrast, however, the present invention may satisfy that ha < 0.5, $|X| < 0.1$, or even $X = 0$. Since Formula (1) of Morozumi '737 does not define k when the difference in tooth number Zd is not 1, so $X = X_2 - X_1 > kh_k$ that formula has little substantive meaning when Zd is other than 1. When the difference in tooth number Zd is equal to 1, Morozumi 3 737 defines that K = 1, so $X_2 > h_k + X_1$ or $X_2 - X_1 > hk$ or $X \geq h_k$ are obtained. It is necessary to point out that when difference in teeth numbers Zd is equal to 1, under the condition that the gears are straight spur gears ($\beta = 0$), $\xi_\beta > 1$, and there is no interference (which is defined in Morozumi '737), the preferred scope of parameters for increasing the efficiency are that X = 0.5 to 0.55, ha = 0.55 to 0.6, i.e. $0.5 < X < h_k < 0.6$ (wherein $h_k$ is ha) and $X = h_k - 0.05$. Thus, Formula (1) of Morozumi '737 cannot exist in effective scope to reduce $|X| < 0.5$ as it is confined by the interference condition.

SUMMARY OF THE INVENTION

The present invention overcomes the disadvantages of the prior art by effectively reducing the absolute value of the difference of addendum modification coefficients $|X|$ to less than or equal to one and, preferably, zero, under the conditions that total contact ratio is relatively high and interference is eliminated, whereby engagement and transmission efficiencies are greatly increased.

In order to realize this object, the invention provides a gear pair having a low tooth number differential. The preferred arrangement comprises an involute internal gear pair including an internal gear and an external gear and having a reference helix angle $\beta$ satisfying $\beta > 0$, a face contact ratio $\xi_\beta$ satisfying $\xi_\beta > 0$, wherein the gear pair has an addendum coefficient ha, a profile contact ratio $\xi_\alpha$ and total contact ratio $\xi_v$ satisfying ha $< 0.55$, $\xi_\alpha < 1$ $\xi_v = \xi_\alpha + \xi_\beta \geq 0.7$, and the relationship among difference in tooth number Zd of the internal gear and the external gear, the absolute value of the difference in addendum modification coefficients X of the internal and the external gear $(X = X_2 - X_1)$ and the addendum coefficient ha satisfying the following table:

| Zd | X | ha |
| --- | --- | --- |
| 1 | $|X| \leq 0.1$ | 0.06 to 0.2 |
| 2 | $|X| \leq 0.01$ | $\leq 0.35$ |
| 3 or 4 | $|X| \leq 0.1$ | $\leq 0.5$ | wherein, preferably, the total contact ratio $\xi_v$ of the gear pair satisfies $\xi_v = \xi_\alpha + \xi_\beta \geq 1$.

It is further preferred that the difference in addendum modification coefficients X, addendum modification coefficient of internal gear $X_2$ and external gear $X_1$ satisfy the following relationship: $X = 0$; $X_2 > 0$ and $X_1 \geq 0$. Additionally, the reference helix angle $\beta$ preferably ranges from about 1° to about 14°, if the gear pair is a helical one, and from about 25° to about 60°, if the gear pair is a double helical spur type.

It is also desirable that the profile angle $\alpha$ (or pressure angle in a reference circle) satisfy the following relationship:

| Zd | $\alpha$ |
| --- | --- |
| 1 | 14° to 25° |
| $\geq 2$ | 6° to 14°. |

According to another aspect of the invention, there is provided a gear pair having a low tooth number differential, wherein the gear pair is an involute internal gear pair and includes an internal gear and an external gear, such that the gear pair has a reference helix angle $\beta$ satisfying $\beta = 0$, a face contact ratio $\xi_\beta$ satisfying $\xi_\beta = 0$, total contact ratio $\xi_v$ satisfying $\xi_v = \xi_\alpha \alpha \xi_\beta \geq 0.7$, a tooth number differential between the internal gear and external gear Zd satisfying Zd = 4 to 6, and an absolute value of the difference in addendum modification coefficients $|X|$ satisfying $|X| < 0.005$ and an addendum coefficient ha satisfying ha $= 0.35$ to 0.6. It is again preferred that the absolute value of the difference in addendum modification coefficients $|X|$ be equal to zero.

According to a further aspect of the invention, there is provided a gear pair having a low tooth number differential, wherein the gear pair is an involute external gear pair and includes an internal gear and an external gear, such that the gear pair has a reference helix angle $\beta$ satisfying $\beta > 0$, a face contact ratio $\xi_\beta$ satisfying $\xi_\beta > 0$, a profile contact ratio $\beta_\alpha$ satisfying $\xi_\alpha < 1$, a total contact ratio $\xi_v$ satisfying $\xi_v = \xi_\alpha + \xi_\beta > 1$, an addendum coefficient ha satisfying ha $= 0.1$ to $0.5$, and an absolute value of difference in addendum modification coefficients $|X|$ satisfying $|X| < 0.1$.

According to a further aspect of the invention, there is provided a gear transmission drive using an involute internal gear pair having a low tooth number differential, wherein the transmission drive includes a left case or housing portion and a right case or housing portion, an integrated or assembled double-ring gear composed of two coaxial external gear rings, one radially outside the other, the double-ring gear being supported by bearings on the eccentric portion of an eccentric shaft. The two gear rings of the double-ring gear respectively engage with a fixed-axis internal gear, which is fixed in the left case and a rotatable fixed axis internal gear which is installed in the right case through low-speed bearings. The eccentric shaft is carried by the left case and also cooperates with an output shaft through high-speed bearings, thus two gear pairs are formed wherein at least one of the gear pairs has the following parameters: the addendum coefficient ha $< 0.55$, the profile contact ratio $\xi_\alpha < 1$, the total contact ratio $\xi_v = \xi_\alpha + \xi_\beta \geq 0.7$, and the relationships among tooth number differential Zd, the difference X in addendum modification coefficients of the internal gear and the external gear, and the addendum coefficient ha satisfy the following table:

| Zd | X | ha |
| --- | --- | --- |
| 1 | $|X| \leq 0.1$ | 0.06 to 0.2 |
| 2 | $|X| \leq 0.1$ | $< 0.35$ |
| 3 or 4 | $|X| \leq 0.1$ | $< 0.5$. |

Preferably, the two gear pairs are helical gears, the two external gear rings are of same hand and the two internal gear rings are of the same hand. It is further preferred that the two gear rings of each gear pair have teeth widths at least partially overlapping axially with each other. In this connection, it is most desirable that the centers of the teeth widths of the two gear rings of each pair overlap axially.

Other details, objects and advantages of the present invention will become apparent as the following description of the presently preferred embodiments and presently preferred methods of practicing the invention proceeds.

BRIEF DESCRIPTION OF THE DRAWINGS

The invention will become more readily apparent from the following description of preferred embodiments thereof shown, by way of example only, in the accompanying drawings, wherein.

DETAILED DESCRIPTION OF THE INVENTION

Figure 1:
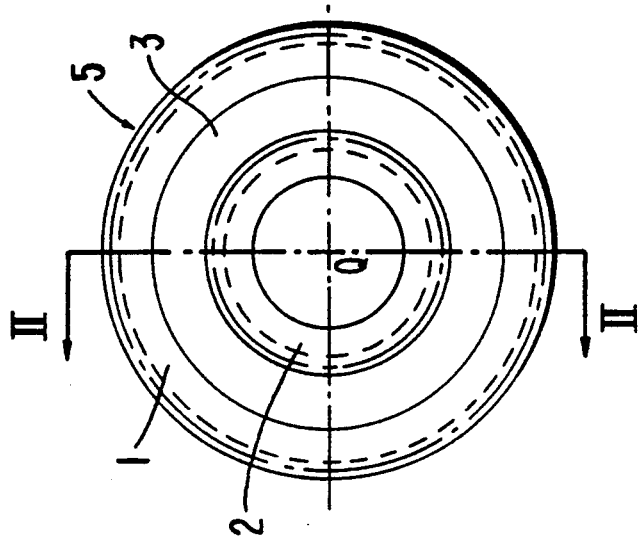
FIG. 1 is an end elevation view of a double-ring gear adapted for use as an involute internal gear pair in accordance with a preferred embodiment of the present invention.
Figure 2:
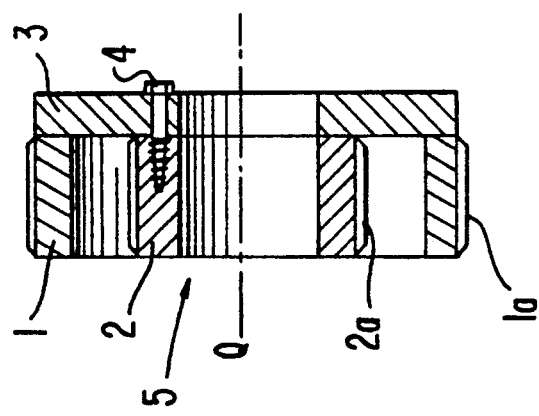
FIG. 2 is a section view of the double-ring gear of FIG. 1 taken along line II—II thereof.
Figure 4:
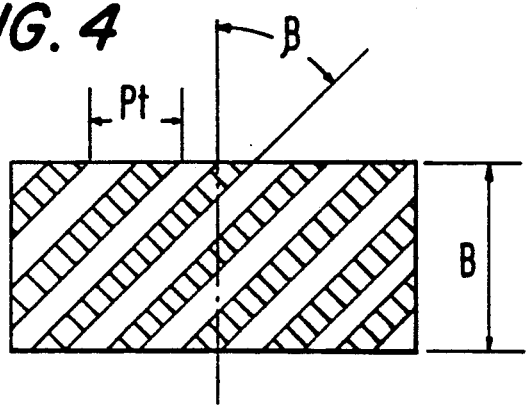
FIG. 4 is a planar projection view of the reference cylinder of a helical gear pair embodying the internal gear pair according to the invention, showing parameters of reference helix angle $\beta$, width of tooth B and transverse circular pitch $P_t$.

FIGS. 1 and 2 illustrate a double-ring gear adapted for use as an involute internal gear pair according to a preferred embodiment of the present invention. In prior constructions, resolution of the contradiction between contact ratio and interference in an involute internal gear pair having a low tooth number differential, $\xi_\alpha \geq 1$ is required because only profile contact ratio $\xi_\alpha$ rather than face contact ratio $\xi_\beta$ is considered. However, according to the present invention, in the situation where the internal gear pair is composed of helical or double helical gears, the reference helix angle $\beta > 0$ (FIG. 4) and the tooth face contact ratio $\xi_\beta > 0$, the effect of $\xi_\beta$ is considered. In order to increase the efficiency of engagement of the gears of the gear pair (and assuming that no interference occurs between the internal gear pair having low tooth number differential which is comprised of the double-ring gear and the other gear, the addendum coefficient ha, the profile contact ratio $\xi_\alpha$ and the total contact ratio $\xi_v$ shall satisfy ha<0.55, $\xi_\alpha < 1$ and $\xi_v = \xi_\beta > 0.7$. Further, the relationship among the tooth number different Zd, the absolute value of the difference in addendum modification coefficients $|X|$ of the internal gear and the external gear ($X = X_2 - X_1$), and the addendum coefficient ha shall satisfy the following conditions:

| Zd | $|X|$ | ha |
|---|---|---|
| 1 | $|X| \leq 0.1$ | 0.06 to 0.02 |
| 2 | $|X| \leq 0.1$ | <0.35 |
| 3 or 4 | $|X| \leq 0.1$ | <0.5 |

Under the above conditions, the decrease of $\xi_\alpha$ usually may result in the increase of the efficiency of engagement, provided that the face contact ratio $\xi_\beta$ of the helical gear is increased to assume that $\xi_v = \xi_\alpha + \xi_\beta \geq 0.7$, preferably, $\xi_v > 1$.

The method described above has similar significance with respect to increasing the engagement efficiency of the external gear pair. In this situation, ha may be reduced to less than 0.5 (to as low as 0.1) and, at the same time, $\xi_\alpha$ may be reduced while $\xi_\beta$ may be increased (e.g., by increasing $\beta$ and tooth width, and reducing module, etc.) so as to make $\xi_v > 1$.

A detailed analysis of the internal gear pair is as follows. The procedures for calculation of $\xi_\alpha$ and $\xi_\beta$ are known. $\xi_\alpha$ may be reduced by reducing the addendum coefficient ha so as to avoid possible profile interference when the tooth number differential Zd between the internal and external gears is low. The optimum parameters are to be chosen from the following range: $|X| \leq 0.1$, preferably $X = X_2 - X_1 = 0$, $X_1 \geq 0$, $X_2 \geq 0$; reference helix angle $\beta$ = about 1° to about 14° (for a helical gear) and $\xi$ = about 25° to about 60° (for a double helical gear); ha=0.06 to 0.2 when the tooth number differential Zd=1, ha=0.2 to 0.35 when Zd=2, and ha<0.5 when Zd=3 or 4.

In order to reduce the load on the planetary bearings (to be described hereinafter) a relatively small profile angle $\alpha$ may be used for the involute internal gear pair having a low tooth number differential. The structural strength of the gear is inherently sufficient because of the internal engagement, the low tooth number differential, and the relatively high numbers of teeth and pairs of simultaneously engaged teeth. In order to offset the limitation to the reduction of angle due to undercut, flank profile interference and strength, the addendum coefficient ha may be greatly reduced and this positive addendum modification may be adopted whereby the difference in addendum modification coefficients may equal zero. Of course, the addendum modification coefficients $X_2$ and $X_1$ of both of the internal and external gears may be equal to zero and the profile angle $\alpha$ may be reduced to less than 25° (to as low as 6°), preferably about 6° to about 14° when Zd>2, or about 14° to about 25° when Zd=1. The decrease of angle results in an accompanying decrease in the radial component of the engaging force acting on the planetary bearings. Simultaneously, the contact ratio increases and the engagement efficiency improves. In the double internal gear planetary transmission with the double ring gear, the radial component of the engaging force, which is proportional to the tangent of profile angle $\alpha$, is the primary force acting on the planetary bearings. Therefore, the small profile angle $\alpha$ is of specific significance.

Regardless of whether the double ring gear is used, if helical gears are employed in the double internal gear planetary transmission, the helices of two internal gear pairs must be in the same hand, either both are left-handed, or both right-handed, so as to offset the axial forces acting on the planetary bearings.

If straight spur gears are used, the optimum difference in teeth numbers is 4 to 6, ha is 0.35 to 0.6, and the addendum modification coefficient X shall satisfy $|X| < 0.05$, preferably, X=0.

The involute internal gear pair according to the invention may be used in a high-efficiency gear transmission (FIG. 3), wherein a double-ring gear 5' (or 5 in FIGS. 1 and 2) is comprised of two gear rings 1' and 2' (FIG. 3) or 1,2 (FIGS. 1 and 2) and one face plate 3 coaxially assembled together as a unit. Desirably, the double gear 5 or 5' is structure composed of a gear ring 1' situated coaxially and concentrically radially outside gear ring 2'. Both gear rings 1' and 2' (which have different numbers of teeth) are fixed on the same side of the face plate 3. Their common axis may for purposes of convenience in description be referred to as the axis of the double-ring gear 5 or 5'. Bolts 4 (one of which is shown in FIG. 2) may be used to connect the face plate 3 to the gear rings 1' and 2'. Other methods of connection may also be used. For example, if such is desired or necessary, one or both of the gear rings may be made integral with the face plate to simplify the manufacture, such as is shown in double ring gear 5' of FIG. 3.

The two gear rings 1' and 2' have tooth widths B at least partially overlapping axially with each other. Preferably, the centers of the tooth widths of the two gear rings 1' and 2' axially overlap. In other words, it is preferable that they lie substantially in a common plane extending generally transverse to the axis of the double-ring gear.

The gear rings 1, 1' and 2, 2' of the double-ring gear 5, 5' must either be both external gears or internal gears, i.e., their gear teeth 1a, 1a' and 2a, 2a' lie either on the exterior circumferential surface or the interior circumferential surface thereof. External gears are favorable for reducing the volume of the transmission.

Figure 3:
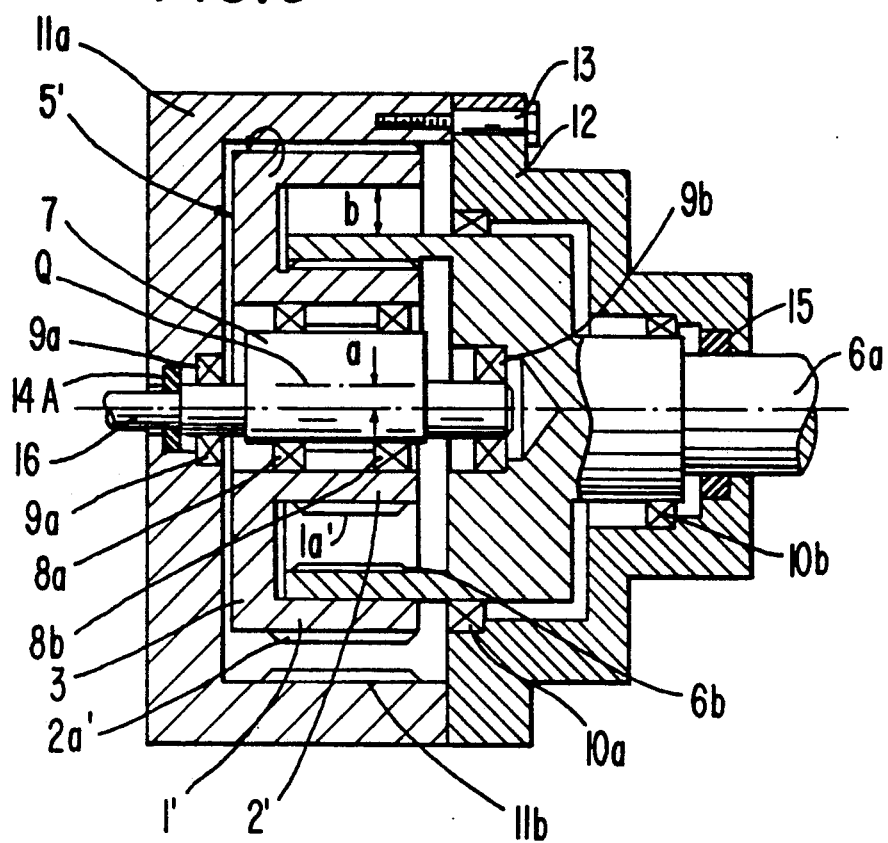
FIG. 3 is a section view of a preferred embodiment of a gear transmission provided with an involute internal gear pair, constructed according to the present invention.

An example of a presently preferred embodiment of a transmission provided with a double ring gear is shown in FIG. 3, wherein at least one of the, two gear pairs (1' and 2') has the general parameters of the external gear pair as described above. More particularly, the transmission comprises the double-rang gear 5', which is sleeved through planetary bearing 8a and 8b on the eccentric portion Q of an eccentric shaft 7. In this embodiment, both gear rings 1', 2' of the double ring gear 5' are external gears as is represented by gear toothing 1a' and 2a'. The outer gear 1' is engaged with a fixed-axis internal gear 11b fixed in a left case or first transmission housing portion 11a. Fixed-axis internal gear 11b may be made separately and then connected to left case 11a or formed integrally therewith. The inner gear 2' engages a rotatable fixed-axis internal gear 6b integrated with or assembled on a low-speed shaft (i.e., output shaft) 6a. Shaft 6a is rotatably supported in a right case or second transmission housing portion 12 through low speed bearings 10a and 10b, while the eccentric shaft 7 is supported for rotation in the left case 11a and on the output shaft 6a respectively through high speed bearings 9a and 9b. Reference numerals 14 and 15 designate oil seals while numeral 13 is indicative of a fastening bolt, or the like, a plurality of which are used to fasten the left and right cases to one another. For clarity, a counterweight and other common transmission components are not shown in FIG. 3. When eccentric shaft 7 rotates at high speed, it drives the double-ring gear 5' engaged with fixed-axis internal gears 11b, 6b to move in an orbital path established by the engagement of teeth 2a' and 11b. Fixed-axis internal gear 6b drives output shaft 6a to therefore rotate slowly relative to shaft 7. The instantaneous position of double-ring gear 5' shown in FIG. 3 is where the double ring gear 5' is to the "highest" point in that figure. The distance "b" between the internal circumferential surface of the outer gear ring 1' of the double-ring gear 5' and the external circumferential surface of fixed-axis gear 6b must be more than twice the eccentricity distance "a" of eccentric shaft 7.

In one example of the invention, the parameters of the gear pair are as follows: profile angle $\alpha = 14.5°$, $\beta = 6°$, external gear tooth number $Z_1 = 87$, internal gear tooth number $Z_2 = 89$, $X_1 = X_2 = 0$, ha = 0.1, tooth width B = 80 mm, module m = 3.5. Using the performance equations described hereinabove proposed by Morozumi '737, the following results are obtained: $\xi_\alpha = 0.26$, $\xi_\beta = 0.76$, $\xi_\nu = 1.02$, and no interference occurs. When the double-ring gear 5 is used as a double internal gear planetary reducer having a reduction ratio i = 1000, its loss is only about 9% of that of the gear pair obtained by means of angle modification. The engagement efficiency of the engaged gear pair is about 0.9916.

The advantages of the invention may further be understood from an analysis of a gear pair transmission assembly known in the art as described below.

A set of parameters of a typical internal gear pair having a low tooth number differential according to the prior art is set forth in Table 2 on page 6 of the specification of Morozumi '737 as follows:

Profile angle $\alpha = 20$, addendum coefficient ha = 1, $Z_2 = 30$, $z_1 = 29$, tooth number difference Zd = 1, addendum modification coefficient $X_2 = 1$, $X_1 = 0$, difference in addendum modification coefficients $X_2 - X_1 = 1$, module m = 4, profile contact ratio $\xi_\alpha = 1.05$, reference helix angle $\beta = 0$ (i.e., it is a straight spur gear pair).

As calculated according to the known formula in Morozumi '737, the angle of engagement obtained is 1.066 rad, the loss factor is about 0.0041. If the gear pair is used for a double internal transmission, the loss of the gear is about 4.1% when the transmission ratio equals 10, and the loss is about 41% when the transmission ratio equals 100. That is to say, the loss of engagement will be 82%, the transmission efficiency of the gears will be reduced to 18% and the total transmission efficiency will be zero when the transmission ratio equals 100 for the transmission of a double internal gear composed of the gear pair with the above mentioned parameters of Morozumi '737. These disadvantages constitute the primary reasons why an internal gear pair having a reduced tooth number differential designed in accordance with the prior art are not and cannot be effectively employed in practical situations.

By way of comparison, a solution to the above problem, using the parameters mentioned above, is obtained by the method of the present invention as illustrated by the following example.

The parameters are as mentioned above in connection with the Morozumi '737 transmission, except for the following: the reference helix angle $\beta = 12$, transverse-profile angle $$\alpha_t = \arctan \frac{\tan \alpha}{\cos \beta} = 20.41,$$

addendum modification coefficient $X_2 = x_1 = 0$, addendum coefficient ha = 0.1, and width of tooth B = 32 mm.

Using these parameters, the following advantageous results can be obtained by way of the known equations of Morozumi '737: no interference occurs, the angle of engagement is decreased to 0.356 rad, the profile contact ratio is decreased to $\xi_\alpha = 0.193$, the face contact ratio $\xi_\beta$ is decreased to $\xi_\beta = 0.888$, the total contact ratio $\xi_\nu = 1.08$, and the loss factor of the internal gear pair is about $3.2 \times 10^{-5}$. If it is used for double internal gearing, the loss is about 0.032% when the transmission ratio is 10 and the loss is about 0.32% when the transmission ratio is 100. That is to say, the loss of engagement will be decreased to 0.64%, the transmission efficiency of the gear will be 99% and the total transmission efficiency (for double ring construction) is about 95%, when the transmission ratio equals to 100. If the transmission ratio is 1000, the transmission efficiency of the gear may be about 93%, which efficiency is unobtainable by any method known in the prior art.

It is further contemplated that by employing gear parameters propounded by the present invention, the transmission ratio and the strength of the gear transmission will be greatly increased as further technological improvements are realized in the formation of the tooth surface and other relevant parameters.

Although the invention has been described in detail for the purpose of illustration, it is to be understood that such detail is solely for that purpose and that variations can be made therein by those skilled in the art without departing from the spirit and scope of the invention except as it may be limited by the claims.

We claim:

1. An involute internal gear pair comprising an internal gear and an external gear having a tooth number differential Zd of no greater than 4, a reference helix angle $\beta$ satisfying $\beta > 0$, a face contact ratio $\xi_\beta$ satisfying $\xi_\beta > 0$, wherein said gear pair has an addendum coefficient ha, a profile contact ratio $\xi_\alpha$ and total contact ratio $\xi_v$ satisfying ha<0.55, $\xi_\alpha$<1 and $\xi_v = \xi_\alpha + \xi_\beta \geq 0.7$, and wherein relationships among tooth number differential Zd between the internal gear and the external gear, the difference X in addendum modification coefficients $X_2$ and $X_1$, respectively, of the internal gear and the external gear, and the addendum coefficient ha satisfy the following table:

| Zd | X | ha |
| --- | --- | --- |
| 1 | $|X| \leq 0.1$ | 0.06 to 0.2 |
| 2 | $|X| \leq 0.1$ | <0.35 |
| 3 or 4 | $|X| \leq 0.1$ | <0.5. |

2. The gear pair as claimed in claim 1, wherein said total contact ratio $\xi_v$ satisfies $\xi_v = \xi_\alpha + \xi_\beta > 1$.

3. The gear pair as claimed in claim 2, wherein said difference X in addendum modification coefficients, said addendum modification coefficients $X_2$ and $X_1$ of said internal gear and said external gear satisfy the following relationship: X=0; $X_2$>0 and $X_1$>0.

4. The gear pair as claimed in claim 2, wherein said gear pair is a helical gear pair, and said reference helix angle $\beta$ ranges from about 1° to about 14°.

5. The gear pair as claimed in claim 2, wherein said gear pair is a double helical spur gear pair, and said reference helix angle $\beta$ ranges from about 25° to about 60°.

6. The gear pair as claimed in claim 2, wherein said gear pair has a profile angle e satisfying the following relationship with respect said tooth number differential Zd:

| Zd | $\alpha$ |
| --- | --- |
| 1 | 14° to 25° |
| $\geq 2$ | 6° to 14°. |

7. An involute internal gear pair comprising an internal gear and an external gear, wherein the gear pair has a reference helix angle $\beta$ satisfying $\beta = 0$, a face contact ratio $\xi_\beta$ satisfying $\xi_\beta = 0$, a difference in addendum modification coefficient X between the internal gear and the external gear satisfying $|X| < 0.005$, and an addendum coefficient ha satisfying ha=0.35 to 0.6.

8. The gear pair as claimed in claim 7, wherein said difference in addendum modification coefficient X is equal to zero.

9. An involute internal gear pair comprising an internal gear and an external gear having a reference helix angle $\beta$ satisfying $\beta > 0$, a face contact ratio $\xi_\beta$ satisfying $\xi_\beta > 0$, wherein the gear pair has an addendum coefficient ha, a profile contact ratio $\xi_\alpha$ a total contact ratio $\xi_v$, and a difference in addendum modification coefficient X between the two gears of the gear pair satisfying $\xi_{60} < 1$ and $\xi_v = \xi_\alpha + \xi_\beta > 1$; ha=0.1 to 0.5, and $|X| < 0.1$.

10. A gear transmission using the involute gear pair as claimed in claim 1 or claim 7, including a first housing portion and a second housing portion and an integrated double-ring gear comprising two concentrically arranged coaxial external gear rings, said double-ring gear being supported by bearings on an eccentric portion of an eccentric shaft, said gear rings of the double-ring gear respectively engaging with a fixed-axis internal gear fixed to said first housing portion and a rotatable fixed-axis internal gear rotatably supported in said second housing portion through low-speed bearings, said eccentric shaft being supported for rotation in said first housing portion and within an output shaft through high-speed bearings whereby two gear pairs are formed wherein at least one of the gear pairs has the following parameters: an addendum coefficient ha, a profile contact ratio $\xi_\alpha$ and total contact ratio $\xi_v$ satisfying ha<0.55, $\xi_\alpha < 1$ and $\xi_\alpha = \xi_\alpha + \alpha_\beta \geq 0.7$ and a relationship among tooth number differential Zd between the internal gear and the external gear, a difference in addendum modification coefficient X between the internal gear and the external gear, and an addendum coefficient ha satisfying the following table:

| Zd | X | ha |
| --- | --- | --- |
| 1 | $|X| \leq 0.1$ | 0.06 to 0.2 |
| 2 | $|X| \leq 0.1$ | $\leq 0.35$ |
| 3 or 4 | $|X| \leq 0.1$, | $\leq 0.5$. |

11. The gear transmission as claimed in claim 10, wherein said two gear pairs are helical gears, said two gear rings are of same hand, and said two internal gears are of the same hand.

12. The gear transmission as claimed in claim 10, wherein said two gear rings have tooth widths at least partially axially overlapping one another.

13. The gear transmission as claimed in claim 12 wherein centers of the tooth widths of said two gear rings overlap axially.

* * * * *

UNITED STATES PATENT AND TRADEMARK OFFICE
CERTIFICATE OF CORRECTION

PATENT NO. : 5,232,412

DATED : August 3, 1993

INVENTOR(S) : Zheng Yue; Li Lan

It is certified that error appears in the above-identified patent and that said Letters Patent is hereby corrected as shown below:

> On the title page, items [76]:
> the inventors, delete "Yue Zheng; Lan Li"
> and insert -- Zheng Yue; Li Lan--.

Signed and Sealed this

Twelfth Day of April, 1994

Attest:

BRUCE LEHMAN

Attesting Officer

Commissioner of Patents and Trademarks

UNITED STATES PATENT AND TRADEMARK OFFICE
CERTIFICATE OF CORRECTION

PATENT NO. : 5,232,412
DATED : August 3, 1993
INVENTOR(S) : Yue ZHENG et al.

It is certified that error appears in the above-identified patent and that said Letters Patent is hereby corrected as shown below:

column 3, line 36, change "$X_2>0$" to --$X_2 \geq 0$--.

In Claim 3 at column 9, line 21 (last line of Claim 3), change "$X_2>0$" to --$X_2 \geq 0$--; and change "$X_1>0$" to --$X_1 \geq 0$--.

In Claim 9 at column 10, line 8, change "$\xi_{60}<1$" to --$\xi_\alpha<1$--.

Signed and Sealed this

Twentieth Day of December, 1994

Attest:

BRUCE LEHMAN

*Attesting Officer*     *Commissioner of Patents and Trademarks*